(12) United States Patent
Karandikar

(10) Patent No.: US 11,546,426 B2
(45) Date of Patent: *Jan. 3, 2023

(54) SYSTEM AND METHOD FOR CLIENT POLICY ASSIGNMENT IN A DATA STORAGE SYSTEM

(71) Applicant: Commvault Systems, Inc., Tinton Falls, NJ (US)

(72) Inventor: Amey Vijaykumar Karandikar, Long Branch, NJ (US)

(73) Assignee: Commvault Systems, Inc., Tinton Falls, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/388,758

(22) Filed: Jul. 29, 2021

(65) Prior Publication Data

US 2021/0360067 A1 Nov. 18, 2021

Related U.S. Application Data

(63) Continuation of application No. 16/922,817, filed on Jul. 7, 2020, now Pat. No. 11,108,864, which is a
(Continued)

(51) Int. Cl.
*G06F 15/16* (2006.01)
*H04L 67/1097* (2022.01)
(Continued)

(52) U.S. Cl.
CPC ........ *H04L 67/1097* (2013.01); *G06F 3/0607* (2013.01); *G06F 3/067* (2013.01);
(Continued)

(58) Field of Classification Search
None
See application file for complete search history.

(56) References Cited

U.S. PATENT DOCUMENTS

| 4,084,231 A | 4/1978 | Capozzi et al. |
| 4,267,568 A | 5/1981 | Dechant et al. |

(Continued)

FOREIGN PATENT DOCUMENTS

| EP | 0259912 | 3/1988 |
| EP | 0405926 | 1/1991 |

(Continued)

OTHER PUBLICATIONS

Arneson, "Mass Storage Archiving in Network Environments" IEEE, Oct. 31-Nov. 1998, pp. 45-50.
(Continued)

*Primary Examiner* — Razu A Miah
(74) *Attorney, Agent, or Firm* — Knobbe, Martens, Olson & Bear, LLP

(57) ABSTRACT

A system and method for property assignment in a data storage system is presented. A data storage system defines a client configuration profile comprising a set of storage operation properties, wherein the storage operation properties regulate criteria for performing storage operations by the data agent on client devices that are associated with the client configuration profile. A storage management system associates a first client device to the client configuration profile; and communicates the set of properties of the client configuration profile to property tables of corresponding objects in the first client device.

20 Claims, 6 Drawing Sheets

Related U.S. Application Data continuation of application No. 16/390,880, filed on Apr. 22, 2019, now Pat. No. 10,757,191, which is a continuation of application No. 15/474,135, filed on Mar. 30, 2017, now Pat. No. 10,313,442, which is a continuation of application No. 15/080,291, filed on Mar. 24, 2016, now Pat. No. 9,648,106, which is a continuation of application No. 14/341,708, filed on Jul. 25, 2014, now Pat. No. 9,323,466, which is a continuation of application No. 13/095,751, filed on Apr. 27, 2011, now abandoned.

(51) Int. Cl.
| | | |
|---|---|---|
| *G06F 3/06* | (2006.01) | |
| *H04L 67/02* | (2022.01) | |
| *H04L 67/306* | (2022.01) | |
| *H04L 67/00* | (2022.01) | |
| *H04L 67/01* | (2022.01) | |

(52) U.S. Cl.
CPC .......... *G06F 3/0629* (2013.01); *G06F 3/0644* (2013.01); *H04L 67/02* (2013.01); *H04L 67/306* (2013.01); *H04L 67/34* (2013.01); *H04L 67/01* (2022.05)

(56) References Cited

U.S. PATENT DOCUMENTS

| | | | |
|---|---|---|---|
| 4,283,787 A | 8/1981 | Chambers | |
| 4,417,321 A | 11/1983 | Chang et al. | |
| 4,641,274 A | 2/1987 | Swank | |
| 4,654,819 A | 3/1987 | Stiffler et al. | |
| 4,686,620 A | 8/1987 | Ng | |
| 4,912,637 A | 3/1990 | Sheedy et al. | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,301,286 A | 4/1994 | Rajani | |
| 5,321,816 A | 6/1994 | Rogan et al. | |
| 5,347,653 A | 9/1994 | Flynn et al. | |
| 5,410,700 A | 4/1995 | Fecteau et al. | |
| 5,420,996 A | 5/1995 | Aoyagi | |
| 5,454,099 A | 9/1995 | Myers et al. | |
| 5,559,991 A | 9/1996 | Kanfi | |
| 5,642,496 A | 6/1997 | Kanfi | |
| 6,418,478 B1 | 7/2002 | Ignatius et al. | |
| 6,542,972 B2 | 4/2003 | Ignatius et al. | |
| 6,644,557 B1 | 11/2003 | Jacobs et al. | |
| 6,658,436 B2 | 12/2003 | Oshinsky et al. | |
| 6,687,743 B1 | 2/2004 | Innes | |
| 6,721,767 B2 | 4/2004 | De Meno et al. | |
| 6,760,723 B2 | 7/2004 | Oshinsky et al. | |
| 6,820,130 B1 | 11/2004 | Miyamoto | |
| 7,003,641 B2 | 2/2006 | Prahlad et al. | |
| 7,020,754 B1 | 3/2006 | Walton et al. | |
| 7,035,880 B1 | 4/2006 | Crescenti et al. | |
| 7,130,970 B2 | 10/2006 | Devassy et al. | |
| 7,162,496 B2 | 1/2007 | Amarendran et al. | |
| 7,174,433 B2 | 2/2007 | Kottomtharayil et al. | |
| 7,246,207 B2 | 7/2007 | Kottomtharayil et al. | |
| 7,249,182 B1 | 7/2007 | Heinonen et al. | |
| 7,315,923 B2 | 1/2008 | Retnamma et al. | |
| 7,343,453 B2 | 3/2008 | Prahlad et al. | |
| 7,386,801 B1 | 6/2008 | Horvitz et al. | |
| 7,389,311 B1 | 6/2008 | Crescenti et al. | |
| 7,395,282 B1 | 7/2008 | Crescenti et al. | |
| 7,440,982 B2 | 10/2008 | Lu et al. | |
| 7,454,569 B2 | 11/2008 | Kavuri et al. | |
| 7,461,144 B1 | 12/2008 | Beloussov et al. | |
| 7,490,207 B2 | 2/2009 | Amarendran et al. | |
| 7,500,053 B1 | 3/2009 | Kavuri et al. | |
| 7,529,782 B2 | 5/2009 | Prahlad et al. | |
| 7,536,291 B1 | 5/2009 | Vijayan Retnamma et al. | |
| 7,543,125 B2 | 6/2009 | Gokhale | |
| 7,546,324 B2 | 6/2009 | Prahlad et al. | |
| 7,603,386 B2 | 10/2009 | Amarendran et al. | |
| 7,606,844 B2 | 10/2009 | Kottomtharayil | |
| 7,613,752 B2 | 11/2009 | Prahlad et al. | |
| 7,617,253 B2 | 11/2009 | Prahlad et al. | |
| 7,617,262 B2 | 11/2009 | Prahlad et al. | |
| 7,620,710 B2 | 11/2009 | Kottomtharayil et al. | |
| 7,636,743 B2 | 12/2009 | Erofeev | |
| 7,651,593 B2 | 1/2010 | Prahlad et al. | |
| 7,657,550 B2 | 2/2010 | Prahlad et al. | |
| 7,660,807 B2 | 2/2010 | Prahlad et al. | |
| 7,661,028 B2 | 2/2010 | Erofeev | |
| 7,747,579 B2 | 6/2010 | Prahlad et al. | |
| 7,801,864 B2 | 9/2010 | Prahlad et al. | |
| 7,809,914 B2 | 10/2010 | Kottomtharayil et al. | |
| 8,170,995 B2 | 5/2012 | Prahlad et al. | |
| 8,229,954 B2 | 7/2012 | Kottomtharayil et al. | |
| 8,239,553 B2 | 8/2012 | Mannar | |
| 8,260,831 B2 | 9/2012 | Tyrrell et al. | |
| 8,266,406 B2 | 9/2012 | Kavuri | |
| 8,285,681 B2 | 10/2012 | Prahlad et al. | |
| 8,296,414 B1 | 10/2012 | Wood et al. | |
| 8,307,177 B2 | 11/2012 | Prahlad et al. | |
| 8,364,652 B2 | 1/2013 | Vijayan et al. | |
| 8,370,542 B2 | 2/2013 | Lu et al. | |
| 8,548,417 B2 | 10/2013 | Tucker et al. | |
| 8,578,120 B2 | 11/2013 | Attarde et al. | |
| 9,049,079 B2 | 6/2015 | Sasatani | |
| 9,323,466 B2 | 4/2016 | Vijayan et al. | |
| 9,648,106 B2 | 5/2017 | Karandikar | |
| 10,313,442 B2 | 6/2019 | Karandikar | |
| 10,757,191 B2 | 8/2020 | Karandikar | |
| 11,108,864 B2 | 8/2021 | Karandikar | |
| 2002/0059404 A1 | 5/2002 | Schaaf et al. | |
| 2002/0078337 A1 | 6/2002 | Moreau et al. | |
| 2002/0108057 A1 | 8/2002 | Zhanhong Wu et al. | |
| 2002/0120765 A1* | 8/2002 | Boehmke ................ H04L 67/14 709/231 | |
| 2003/0033398 A1 | 2/2003 | Carlson et al. | |
| 2003/0055952 A1 | 3/2003 | Motoyama et al. | |
| 2003/0120725 A1 | 6/2003 | Chung et al. | |
| 2003/0204602 A1 | 10/2003 | Hudson et al. | |
| 2004/0153471 A1 | 8/2004 | Saika et al. | |
| 2004/0153481 A1 | 8/2004 | Talluri | |
| 2004/0167973 A1 | 8/2004 | Shima et al. | |
| 2004/0181579 A1 | 9/2004 | Huck et al. | |
| 2004/0199621 A1 | 10/2004 | Lau | |
| 2005/0060506 A1 | 3/2005 | Higaki et al. | |
| 2005/0097008 A1 | 5/2005 | Ehring et al. | |
| 2005/0193128 A1 | 9/2005 | Dawson et al. | |
| 2006/0064503 A1 | 3/2006 | Brown et al. | |
| 2006/0169768 A1 | 8/2006 | Gangi | |
| 2006/0224846 A1 | 10/2006 | Amarendran et al. | |
| 2006/0224852 A1* | 10/2006 | Kottomtharayil ..... G06F 3/0683 711/170 | |
| 2007/0022194 A1 | 1/2007 | Brown et al. | |
| 2007/0050575 A1 | 3/2007 | Uratani et al. | |
| 2007/0185938 A1 | 8/2007 | Prahlad et al. | |
| 2007/0198802 A1 | 8/2007 | Kavuri | |
| 2007/0239793 A1 | 10/2007 | Tyrrell et al. | |
| 2007/0245002 A1 | 10/2007 | Nguyen et al. | |
| 2008/0016126 A1* | 1/2008 | Kottomtharayil ..... G06F 3/0635 | |
| 2008/0016196 A1 | 1/2008 | MacMillan et al. | |
| 2008/0028042 A1 | 1/2008 | Bealkowski | |
| 2008/0201535 A1 | 8/2008 | Hara | |
| 2008/0228785 A1 | 9/2008 | Kavuri et al. | |
| 2009/0094370 A1 | 4/2009 | Jacob et al. | |
| 2009/0125680 A1 | 5/2009 | Ninose et al. | |

(56) References Cited

U.S. PATENT DOCUMENTS

| | | |
|---|---|---|
| 2009/0217350 A1 | 8/2009 | Manning et al. |
| 2009/0319534 A1 | 12/2009 | Gokhale |
| 2010/0064067 A1 | 3/2010 | Kottomtharayil et al. |
| 2010/0082541 A1* | 4/2010 | Kottomtharayil ....... G06F 16/27 707/634 |
| 2010/0088392 A1* | 4/2010 | Kuhl .................... G06F 16/185 709/217 |
| 2010/0115098 A1 | 5/2010 | De Baer et al. |
| 2010/0162335 A1 | 6/2010 | Davis |
| 2010/0199037 A1 | 8/2010 | Umbehocker et al. |
| 2010/0306236 A1 | 12/2010 | Cychosz et al. |
| 2010/0332456 A1 | 12/2010 | Prahlad et al. |
| 2011/0022812 A1 | 1/2011 | van der Linden et al. |
| 2011/0078129 A1 | 3/2011 | Chunilal |
| 2011/0093580 A1 | 4/2011 | Nagasaka et al. |
| 2011/0138154 A1 | 6/2011 | Tevis et al. |
| 2011/0276396 A1 | 11/2011 | Rathod |
| 2011/0296488 A1 | 12/2011 | Dandekar et al. |
| 2012/0047581 A1 | 2/2012 | Banerjee et al. |
| 2012/0150818 A1 | 6/2012 | Vijayan Retnamma et al. |
| 2012/0150826 A1 | 6/2012 | Vijayan Retnamma et al. |
| 2012/0158926 A1* | 6/2012 | Lai .......................... H04L 67/34 709/221 |
| 2012/0254119 A1 | 10/2012 | Kumarasamy et al. |
| 2013/0004078 A1 | 1/2013 | Miyazaki et al. |
| 2013/0144939 A1 | 6/2013 | Prahlad |
| 2013/0227352 A1 | 8/2013 | Kumarasamy et al. |
| 2013/0253977 A1 | 9/2013 | Vibhor |
| 2013/0339298 A1 | 12/2013 | Muller et al. |
| 2014/0025638 A1 | 1/2014 | Hu et al. |
| 2014/0115114 A1 | 4/2014 | Garmark et al. |
| 2014/0149530 A1 | 5/2014 | Dietz et al. |
| 2014/0189051 A1 | 7/2014 | Hunter |
| 2014/0317271 A1 | 10/2014 | Kim et al. |
| 2016/0036667 A1 | 2/2016 | Kripalani et al. |
| 2016/0254963 A1 | 9/2016 | Vibhor |
| 2020/0336539 A1 | 10/2020 | Karandikar |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/12098 | 3/1999 |
| WO | WO 2006/052872 | 5/2006 |

OTHER PUBLICATIONS

Cabrera, et al. "ADSM: a Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

Huff, Kl, "Data Set Usage Sequence Number," IBM Technical Disclosure Bulletin, vol. 24, No. 5, Oct. 1981 New York, US, pp. 2404-2406.

Rosenblum et al., "The Design and Implementation of a Log-Structure File System," Operating Systems Review SIGOPS, vol. 25, No. 5, May 1991, New York, US, pp. 1-15.

* cited by examiner

SYSTEM AND METHOD FOR CLIENT POLICY ASSIGNMENT IN A DATA STORAGE SYSTEM

CROSS-REFERENCE TO RELATED APPLICATIONS

This application is a continuation of application Ser. No. 16/922,817 filed on Jul. 7, 2020, which is a continuation of application Ser. No. 16/390,880, filed on Apr. 22, 2019, which is a continuation of application Ser. No. 15/474,135, filed on Mar. 30, 2017, now U.S. Pat. No. 10,313,442, which is a continuation of application Ser. No. 15/080,291, filed on Mar. 24, 2016, now U.S. Pat. No. 9,648,106, which is a continuation of application Ser. No. 14/341,708, filed on Jul. 25, 2014, now U.S. Pat. No. 9,323,446, which is a continuation of application Ser. No. 13/095,751, filed on Apr. 27, 2011, now abandoned. Any and all applications for which a foreign or domestic priority claim is also identified in the Application Data Sheet, or any correction thereto, are hereby incorporated by reference into this application under 37 CFR 1.57.

TECHNICAL FIELD

The present invention generally relates to data storage, and more particularly, some embodiments relate to systems and methods for policy assignment in data storage systems.

DESCRIPTION OF THE RELATED ART

The storage and retrieval of data is an age-old art that has evolved as methods for processing and using data have evolved. In the early 18th century, Basile Bouchon is purported to have used a perforated paper loop to store patterns used for printing cloth. In the mechanical arts, similar technology in the form of punch cards and punch tape were also used in the 18th century in textile mills to control mechanized looms. Two centuries later, early computers also used punch cards and paper punch tape to store data and to input programs.

However, punch cards were not the only storage mechanism available in the mid 20th century. Drum memory was widely used in the 1950s and 1960s with capacities approaching about 10 kb, and the first hard drive was developed in the 1950s and is reported to have used 50 24-inch discs to achieve a total capacity of almost 5 MB. However, these were large and costly systems and although punch cards were inconvenient, their lower cost contributed to their longevity as a viable alternative.

In 1980 the hard drive broke the 1 GB capacity mark with the introduction of the IBM 3380, which could store more than two gigabytes of data. The IBM 3380, however, was about as large as a refrigerator, weighed ¼ ton, and cost in the range of approximately $97,000 to $142.000, depending on the features selected. This is in stark contrast to contemporary storage systems that provide for storage of hundreds of terabytes of data or more for seemingly instantaneous access by networked devices. Even handheld electronic devices such as digital cameras, MP3 players and others are capable of storing gigabytes of data, and today's desktop computers boast hundreds of gigabytes of storage capacity.

However, with the advent of networked computing, storage of electronic data has migrated from the individual computer to network-accessible storage devices. These include, for example, optical libraries, Redundant Arrays of Inexpensive Disks (RAID), CD-ROM jukeboxes, drive pools and other mass storage technologies. These storage devices are accessible to and can be shared by individual computers such as via a Local Area Network (LAN), a Wide Area Network (WAN), or a Storage Area Network (SAN) to name a few. These client computers not only access their own local storage devices but also storage devices of the network to perform backups, transaction processing, file sharing, and other storage-related operations.

The large volumes of data often stored and shared by networked devices can cause overloading of the limited network bandwidth. For example, during operations such as system backups, transaction processing, file copying and transfer, and other similar operations, the communication bandwidth of the network often becomes the rate determining factor.

In addition, even with large capacity storage systems, computing enterprises are being overloaded by vast amounts of data. Documents sent via email, for example, can be copied and resent multiple times and several instances of the very same document might be stored many times in many different locations. IT administrators are struggling to keep up with the seemingly exponential increase in the volume of documents, media and other data. This problem is severely compounded by other factors such as the large file sizes often associated with multi-media files, and file proliferation through email and other content sharing mechanisms. However, additional storage capacity requires capital expenditures, consumes power, takes up floor space and burdens administrative overhead. Even with additional storage capacity, the sheer volume of data becomes a strain on backup and data recovery plans, leading to greater risk in data integrity.

As an alternative to simply increasing the amount of storage capacity, contemporary enterprises have turned to compression and other like technologies to reduce the volume of data. One such technology that can be used is known as data deduplication. Data deduplication in its various forms eliminates or reduces the amount of redundant data by implementing policies that strive to reduce the quantity of, or even eliminate instances of, redundant data blocks in storage. With data deduplication, data is broken up into segments or blocks. As new data enters the system, the segments are checked to see if they already exist in storage. If a segment already exists, rather than store that segment again, a pointer to the location of the existing segment is stored.

Although deduplication has provided a more efficient utilization of storage space, the size of data storage systems has increased. With or without data deduplication, data storage installations tend to include multiple storage nodes accessing large quantities of data storage.

BRIEF SUMMARY OF EMBODIMENTS OF THE INVENTION

According to various embodiments, systems and methods are provided for populating a client device in a data storage system with specific client storage operation properties. Particularly, in some embodiments, a method for populating a client device with specific client storage operation properties is provided for a data storage system having a storage management system managing a plurality of client devices, the client devices having a coupled data store and a data agent for performing storage operations on its respective client device. In some embodiments, the method includes defining a client configuration profile comprising a set of storage operation properties, wherein the storage operation properties regulate criteria for performing storage operations by the data agent on client devices that are associated with the client configuration profile; the storage management system associating a first client device to the client configuration profile; and the storage management system communicating the set of properties of the client configuration profile to property tables of corresponding objects in the first client device.

In further embodiments, a computer program product is provided for use in a data storage system having a storage management system managing a plurality of client devices, the client devices having a coupled data store and a data agent for performing storage operations on its respective client device, the computer program product comprising a computer-readable storage medium having computer program code embodied therein for enabling a computing device to populate a client device with specific client storage operation properties, the computer-readable program code configured to cause the computing device to perform the operations of: defining a client configuration profile comprising a set of storage operation properties, wherein the storage operation properties regulate criteria for performing storage operations by the data agent on client devices that are associated with the client configuration profile; the storage management system associating a first client device to the client configuration profile; and the storage management system communicating the set of properties of the client configuration profile to property tables of corresponding objects in the first client device.

In still further embodiments, a computing system is provided having a plurality of client data storage devices having a coupled data store and a data agent for performing storage operations on its respective client device; and a storage management system managing the plurality of client data storage devices communicatively coupled to the plurality of data storage nodes and comprising a processor and memory communicatively coupled to the processor, the memory storing instructions to cause the processor to perform the operations of: defining a client configuration profile comprising a set of storage operation properties, wherein the storage operation properties regulate criteria for performing storage operations by the data agent on client devices that are associated with the client configuration profile; the storage management system associating a first client device to the client configuration profile; and the storage management system communicating the set of properties of the client configuration profile to property tables of corresponding objects in the first client device.

The systems and methods described above can further include determining that a blob of data has moved from the first client device to a second client device; verifying whether the first client device is associated with the client configuration policy; and transferring the client configuration policy to the second client device. Additionally, the storage management system can be configured to perform the operations of determining a set of client configuration policy properties and native properties associated with the first device; and creating a new client configuration policy based on a combination of the client configuration policy properties and native properties associated with the first device.

In various embodiments, the storage operation properties can include storage preferences or storage criteria according to which the data agent perform storage operations and can be applied to storage operations according to data type being operated upon. The data type can be based on operating system type or application type, and can include Microsoft Exchange data, Lotus Notes data, Microsoft Windows file system data, Microsoft Active Directory data.

In yet other embodiments, the first client device is a member of a predefined group of a plurality of client devices, and the method further includes associating the predefined group of client devices to the client configuration profile and communicating the set of properties of the client configuration profile to property tables of corresponding objects in the client devices of the predefined group. A client device in the predefined group of a plurality of client devices can be further populated with native properties that are independent of the set of properties of the client configuration profile. The method can further include populating the first client device with additional properties that arc independent of the set of properties of the client configuration profile.

In one embodiment, the property table includes a list of properties assigned to the client device and identifies which of the assigned properties are governed by the client configuration profile to which the client device is associated. In various embodiments, a first property of a client device includes a combination of native properties and properties of the client configuration profile. Additionally, in some embodiments, if the first client device associated with the client configuration profile contains an agent whose type is not currently defined for that client configuration profile, the properties for the client are not governed by the client configuration profile.

In some applications, the first client device associated with the client configuration profile is configured to include a mechanism to identify that object as being part of a client configuration profile at Client, agent, instance, backupset, or sub-client entity levels. Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following Figure. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Figure 1:
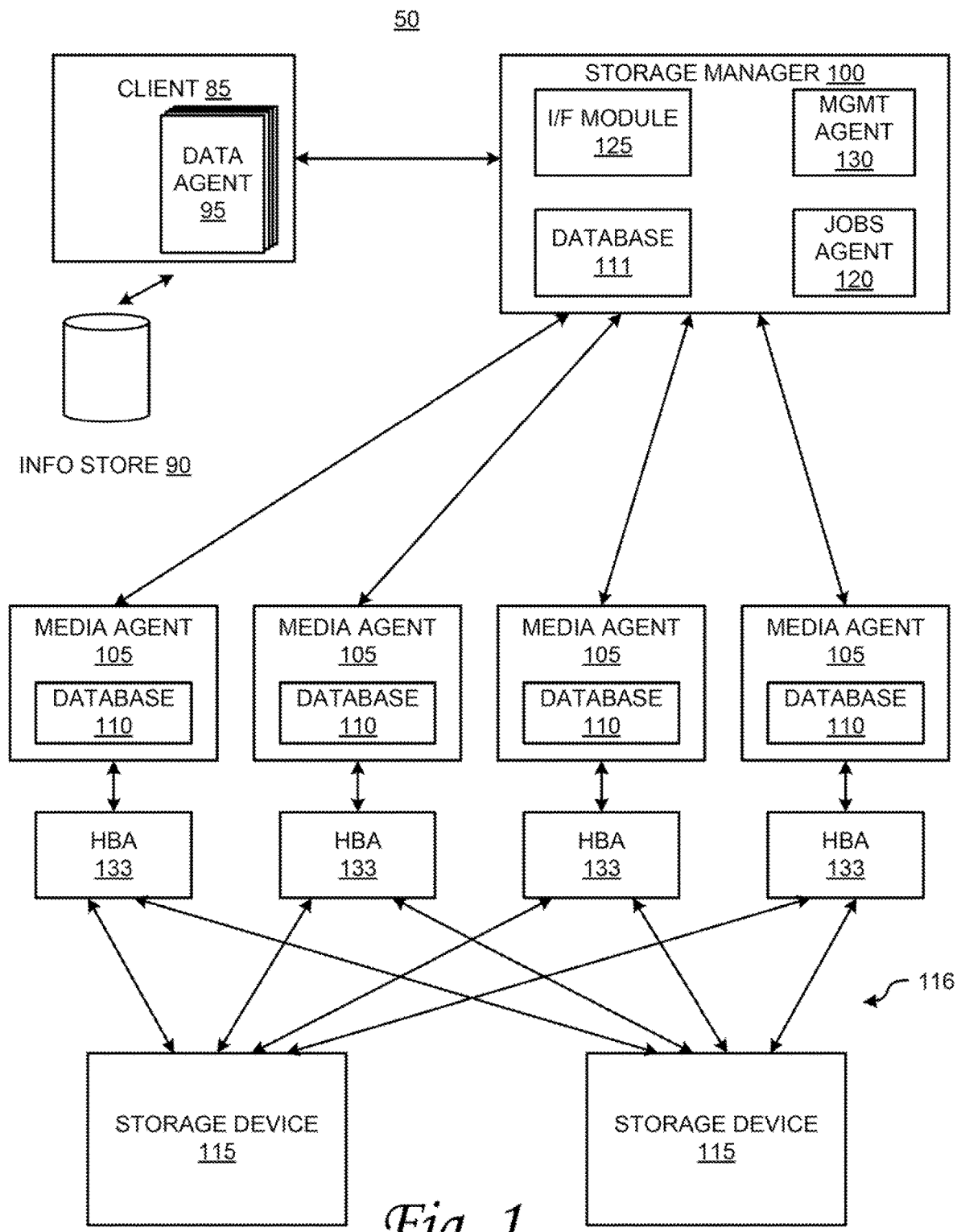
FIG. 1 depicts examples of data storage algorithms and architectures that can be used in conjunction with the systems and methods described herein.

The Figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF EMBODIMENTS OF THE INVENTION

The present invention is directed toward a system and method for populating a client device in a data storage system with specific client storage operation properties. Before describing the invention in detail, it is useful to describe a few example environments with which the invention can be implemented. The systems and methods described herein can be implemented using a number of different storage architectures, with or without data deduplication. One such exemplary storage architecture is described with reference to FIG. 1. The example storage operation cell 50 shown in FIG. 2 may perform storage operations on electronic data such as that in a computer network. As shown in this example, storage operation cell 50 may generally include a storage manager 100, a data agent 95, a media agent 105, a storage device 115. The storage operation cell 50 may also include components such as a client 85, a data or information store 90, databases 110 and 111, jobs agent 120, an interface module 125, a management agent 130. Each media agent 105 may control one or more Input/Output devices such as Host Bus Adaptor (HBA) or other communications link for transferring data from client 85 to storage devices 115 (depicted generally in FIG. 2 as HBA devices 133). Such a system and elements thereof are exemplary of a modular backup system such as the CommVault QiNetix system, and also the CommVault GALAXY backup system, available from CommVault Systems, Inc. of Oceanport, N.J., and further described in U.S. Pat. Nos. 7,035,880 and 7,620,710 each of which is incorporated herein by reference in its entirety.

A storage operation cell, such as cell 50, may generally include combinations of hardware and software components associated with performing storage operations on electronic data. Exemplary storage operation cells according to embodiments of the invention may include, as further described herein, CommCells as embodied in the QNet storage management system and the QiNetix storage management system by CommVault Systems of Oceanport, N.J. According to some embodiments of the invention, storage operation cell 50 may be related to backup cells and provide some or all of the functionality of backup cells as described in U.S. Pat. No. 7,395,282, which is also incorporated by reference herein. However, in certain embodiments, storage operation cells may also perform additional types of storage operations and other types of storage management functions that are not generally offered by backup cells.

In accordance with certain embodiments additional storage operations performed by storage operation cells may include creating, storing, retrieving, and migrating primary data copies and secondary data copies (which may include, for example, snapshot copies, backup copies, Hierarchical Storage Management (HSM) copies, archive copies, and other types of copies of electronic data). In some embodiments, storage operation cells may also provide one or more integrated management consoles for users or system processes to interface with in order to perform certain storage operations on electronic data as further described herein. Such integrated management consoles may be displayed at a central control facility or several similar consoles distributed throughout multiple network locations to provide global or geographically specific network data storage information.

In some embodiments, storage operations may be performed according to a storage policy. A storage policy is generally a data structure or other information source that includes a set of preferences and other storage criteria for performing a storage operation. The preferences and storage criteria may include, but are not limited to, a storage location, relationships between system components, network pathway to utilize, retention policies, data characteristics, compression or encryption requirements, preferred system components to utilize in a storage operation, and other criteria relating to a storage operation. Thus, a storage policy may indicate that certain data is to be stored in a specific storage device, retained for a specified period of time before being aged to another tier of secondary storage, copied to secondary storage using a specified number of streams, etc. A storage policy may be stored to a storage manager database 111, to archive media as metadata for use in restore operations or other storage operations, or to other locations or components of the system.

A schedule policy can be used to specify when to perform storage operations and how often and may also specify performing certain storage operations on sub-clients of data and how to treat those sub-clients. A sub-client may represent static or dynamic associations of portions of data of a volume and are typically mutually exclusive. Thus, a portion of data may be given a label and the association is stored as a static entity in an index, database or other storage location used by the system. Sub-clients may also be used as an effective administrative scheme of organizing data according to data type, department within the enterprise, storage preferences, etc. For example, an administrator may find it preferable to separate e-mail data from financial data using two different sub-clients having different storage preferences, retention criteria, etc. Storage operation cells may contain not only physical devices, but also may represent logical concepts, organizations, and hierarchies. For example, a first storage operation cell 50 may be configured to perform HSM operations, such as data backup or other types of data migration, and may include a variety of physical components including a storage manager 100 (or management agent 130), a media agent 105, a client component 85, and other components as described herein. A second storage operation cell 50 may contain the same or similar physical components, however, it may be configured to perform Storage Resource Management (SRM) operations, such as monitoring a primary data copy or performing other known SRM operations.

Thus, as can be seen from the above, although the first and second storage operation cells are logically distinct entities configured to perform different management functions (e.g., HSM and SRM respectively), each cell may contain the same or similar physical devices in both storage operation cells. Alternatively, in other embodiments, different storage operation cells may contain some of the same physical devices and not others. For example, a storage operation cell 50 configured to perform SRM tasks may contain a media agent 105, client 85, or other network device connected to a primary storage volume, while a storage operation cell 50 configured to perform HSM tasks may instead include a media agent 105, client 85, or other network device connected to a secondary storage volume and not contain the elements or components associated with and including the primary storage volume. These two cells, however, may each include a different storage manager 100 that coordinates storage operations via the same media agents 105 and storage devices 115. This "overlapping" configuration allows storage resources to be accessed by more than one storage manager 100 such that multiple paths exist to each storage device 115 facilitating failover, load balancing and promoting robust data access via alternative routes.

Alternatively, in some embodiments, the same storage manager 100 may control two or more cells 50 (whether or not each storage cell 50 has its own dedicated storage manager 100). Moreover, in certain embodiments, the extent or type of overlap may be user-defined (through a control console (not shown)) or may be automatically configured to optimize data storage and/or retrieval.

Data agent 95 may be a software module or part of a software module that IS generally responsible for archiving, migrating, and recovering data from client computer 85 stored in an information store 90 or other memory location. Each client computer 85 may have at least one data agent 95 and the system can support multiple client computers 85. In some embodiments, data agents 95 may be distributed between client 85 and storage manager 100 (and any other intermediate components (not shown)) or may be deployed from a remote location or its functions approximated by a remote process that performs some or all of the functions of data agent 95.

Generally speaking, storage manager 100 may be a module that coordinates and controls storage operations performed by storage operation cell 50. Storage manager 100 may communicate with some or all elements of storage operation cell 50 including client computers 85, data agents 95, media agents 105, and storage devices 115, to initiate and manage system backups, migrations, and data recovery.

Storage manager 100 may include a jobs agent 120 that monitors the status of some or all storage operations previously performed, currently being performed, or scheduled to be performed by storage operation cell 50. Jobs agent 120 may be communicatively coupled with an interface module 125. Interface module 125 may include information processing and display software, such as a graphical user interface "GUI," an application program interface "API," or other interactive interface through which users and system processes can retrieve information about the status of storage operations. Through interface module 125, users may issue instructions to various storage operation cells 50 regarding performance of the storage operations as described. For example, a user may employ the GUI to view the status of pending storage operations in some or all of the storage operation cells in a given network or to monitor the status of certain components in a particular storage operation cell (e.g., the amount of storage capacity left in a particular storage device).

Storage manager module 100 may also include a management agent 130 that is typically implemented as a software module or application program. In general, management agent 130 provides an interface that allows various management components 100 in other storage operation cells 50 to communicate with one another. For example, assume a certain network configuration includes multiple cells 50 adjacent to one another or otherwise logically related in a WAN or LAN configuration (not shown). With this arrangement, each cell 50 may be connected to the other through each respective interface module 125. This allows each cell 50 to send and receive certain pertinent information from other cells 50 including status information, routing information, information regarding capacity and utilization, etc. These communication paths may also be used to convey information and instructions regarding storage operations.

For example, a management agent 130 in first storage operation cell 50 may communicate with a management agent 130 in a second storage operation cell 50 regarding the status of storage operations in the second storage operation cell. Another illustrative example includes the case where a management agent 130 in first storage operation cell 50 communicates with a management agent 130 in a second storage operation cell to control the storage manager 100 (and other components) of the second storage operation cell via the management agent 130 contained in the storage manager 100.

Another illustrative example is the case where management agent 130 in the first storage operation cell 50 communicates directly with and controls the components in the second storage management cell 50 and bypasses the storage manager 100 in the second storage management cell. If desired, storage operation cells 50 can also be organized hierarchically such that hierarchically superior cells control or pass information to hierarchically subordinate cells or vice versa.

Storage manager 100 may also maintain an index cache, a database, or other data structure (not pictured) that can be stored in storage manager database III or elsewhere. This data structure may be used to indicate logical associations between components of the system, user preferences, management tasks, some SRM or HSM data or other useful data. As further described herein, some of this information may be stored in a media agent database 110 or other local data store according to some embodiments. For example, the storage manager 100 may use data from database 111 to track logical associations between media agents 105 and storage devices 115.

A media agent 105 may be implemented as a module that conveys data, as directed by storage manager 100, between a client computer 85 and one or more storage devices 115 such as a tape library, a magnetic media storage device, an optical media storage device, or any other suitable storage device. In one embodiment, media agents 105 may be communicatively coupled with and control a storage device 115 associated with that particular media agent. A media agent 105 may be considered to be associated with a particular storage device 115 if that media agent 105 is capable of routing and storing data to a particular storage device 115 via one or more communication links such as HBA links 133.

Each HBA link 133 may include multiple HBA communication paths that are associated with one or more media agents 105. HBA link 133 may also communicate data from clients 85 under the supervision of media agents 105 to storage devices 115 via BBA communication paths 116, whereby each HBA link 133 may provide multiple HBA communication paths 116 between each of media agents 105 and storage devices 115. In some embodiments, HBA link 133 may be part of or associated with a storage area network "SAN") and used by various resources with storage management cell 50 to transfer data to storage devices 115. Various exemplary embodiments associated with the connectivity and communication between media agents are described in the aforementioned U.S. Pat. No. 7,620,710.

Each media agent 105 may maintain an index cache, a database, or other data structure which stores index data generated during backup, migration, and restore and other storage operations as described herein. For example, performing storage operations on Microsoft Exchange data may generate index data. Such index data provides a media agent 105 or other external device with a fast and efficient mechanism for locating data stored or backed up. This data can be stored, for example, in database 110.

Thus, in some embodiments, a storage manager database 111 may store data associating a client computer 85 with one or more media agent(s) 105, HBA link 133, and storage device(s) 115, for example, as specified in a storage policy. Media agent database 110 may include information that indicate specifically where client data is stored in storage device 115, what specific files were stored, and other information associated with storage and retrieval of data from client computer 85. In some embodiments, such index data may be stored along with the data copied to a storage device 115, with an additional copy of the index data written to index cache 110. The data in index cache 110 is thus generally readily available for use in storage operations and other activities without having to be first retrieved from the storage device 115.

In some embodiments, certain components may reside and execute on the same computer. For example, certain components may execute on a client computer 85 such as a data agent 95, a media agent 105, or a storage manager 100 which may coordinate and direct local archiving, migration, and retrieval application functions as further described in U.S. Pat. No. 7,035,880. This client computer 85 may function independently or together with other similar client computers 85.

FIG. 1 depicts examples of data storage algorithms and architectures that can be used in conjunction with the systems and methods described herein. For ease of description and to provide contextual foundation, embodiments are described herein in terms of these examples. As would be apparent to one of ordinary skill in the art after reading this description, embodiments can be implemented using these and other deduplication algorithms and architectures.

With various storage architectures a data center may be provided that includes multiple cells 50 or multiple clients 85 for a given cell 50 for data storage operations. As noted above in the example of FIG. 1, there can also be a plurality of sub-clients and agents for a data center. Various policies, such as storage policies and schedule policies (examples of which are also described above) are typically provided to set properties for or govern the operations of data storage entities such as clients, sub-clients and agents. With conventional systems, custom policies are created for each entity individually as needed or upon creation of the client. According to various embodiments of the systems and methods described herein, one or more client configuration profiles are created for a plurality of data storage entities. The client configuration profiles can comprise a template or client model that defines client properties such as, for example, client storage operation properties. Storage operation properties can include, for example, storage preferences or storage criteria such as schedule policies and storage policies. These client configuration profiles are applied to clients and client entities so that individual preferences or policies do not need to be created each time an entity (e.g., a client, sub-client or agent) is created or updated. According to another aspect, the templates can be updated from time to time and propagated to the data storage entities to update the features, characteristics or operation of the entities. Accordingly, some or all properties can be defined for groups of clients, sub-clients and agents once and propagated to those entities for application.

Figure 2:
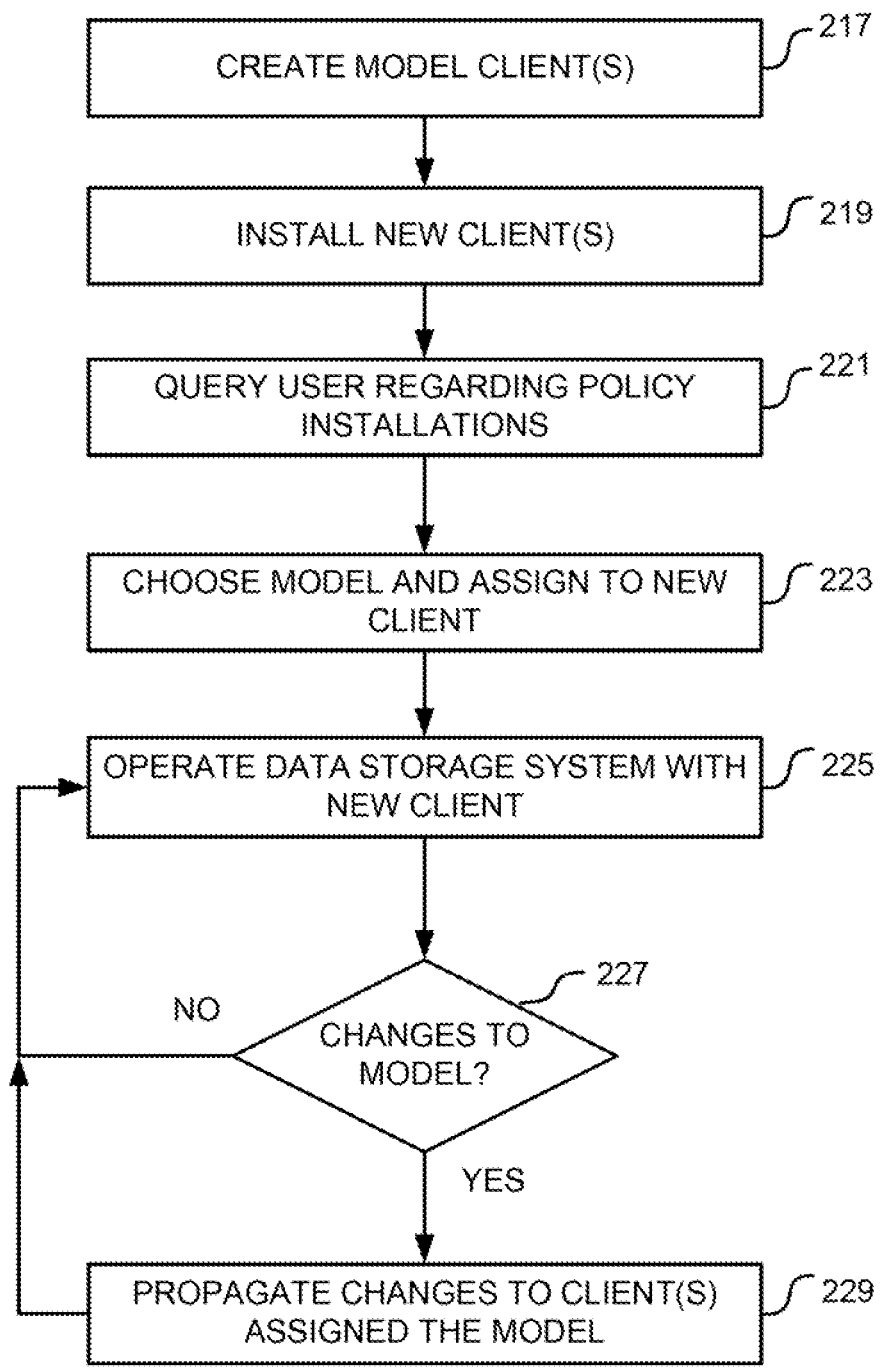
FIG. 2 is a diagram illustrating an example process for client storage operation property propagation in accordance with one embodiment of the systems and methods described herein.

FIG. 2 is a diagram illustrating an example process for client storage operation property propagation in accordance with one embodiment of the systems and methods described herein. At operation 217 one or more client profiles are created. Various client configuration profile templates can be created to identify properties or sets o(properties for clients, sub-clients and agents. In one embodiment, the profiles can be created as client models that contain policy or preference information for a client to which is applied. The model can be created to look and feel like a regular client, except that the client model includes policies or settings information and does not operate like a regular client in the data storage system. Profiles in the model can include client property policies that govern client operations such as schedule policies and storage policies. A storage policy is generally a data structure or other information source that includes a set of preferences and other storage criteria for performing a storage operation. A storage policy is used to govern storage operations such as, for example, where to back up data, whether to perform deduplication, how long to retain data, and so on. A schedule policy, for example, can be used to specify when to perform storage operations. Examples include when to perform storage operations, how often to perform storage operations; where to back up data, when to do pruning operations and so on. Policies may also specify performing certain storage operations on sub-clients of data and how to treat those sub-clients.

At operation 219, when a user desires to bring up a new client for a data storage center, the user installs a new client. At install time, the system in this example is configured to query the user regarding the application of one or more client configuration profiles to the new client being installed. This is shown at operation 221. Where a plurality of different client configuration profiles are available, profile parameters, features and settings can be displayed to the user to facilitate selection from among the multiple client configuration profiles. The parameters, features and settings can also be displayed when only one client configuration profile is available to allow the user to determine whether to apply that client configuration profile and its policies to the new client.

At operation 223, the user chooses a client configuration profile and assigns it to the client. The installation of the client is completed, and the client is brought on-line in the data storage system. The data storage system is operated with the new client as shown at 225. If during operation or at some point after installation a model changes, those changes are propagated to all the clients to which that model was assigned. This is illustrated at 227 and 229.

Figure 3:
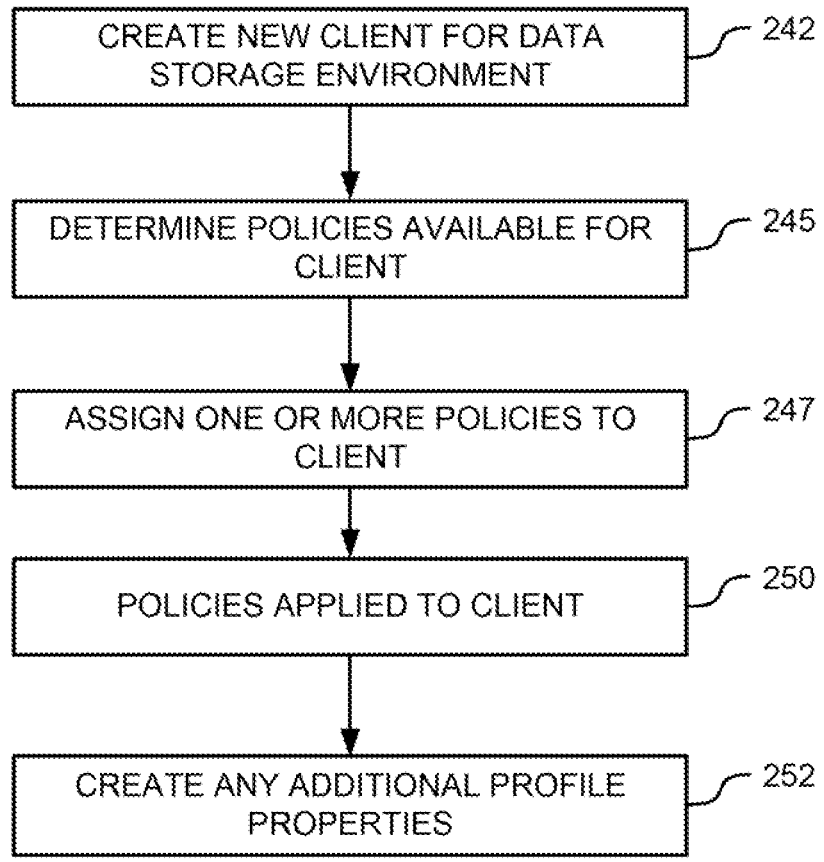
FIG. 3 is a diagram illustrating an example process for applying a client configuration profile to a client in accordance with one embodiment of the systems and methods described herein.

FIG. 3 is a diagram illustrating an example process for applying a client configuration profile to a client in accordance with one embodiment of the systems and methods described herein. At operation 242 a new client is created for a data storage environment. The created client in one embodiment is simply a client shell without settings that are governed by policies from policy profiles or models. For example, the client may have a basic exchange agent, file system and SQL agent, but might not have client properties regarding data storage requirements, pruning, backup, and so on. At install time, the system determines what client configuration profiles are available for that client as shown at 245. The installer may have different client configuration profile from which to choose and can make a selection based on factors such as, for example, performance and operational criteria specified for the client.

At operation 247, the installer reviews the available client configuration profiles against the client criteria and chooses one or more templates to associate with the client. In another embodiment, one or more templates can be automatically assigned to the client without installer action. The installer can be given the opportunity to modify or update assigned client configuration profiles. Then, at operation 250, the assigned client configuration profiles are applied to the client. At operation 252 the policies of the client can be modified. In one embodiment, the policy modifications can apply additional policies to the client—i.e., policies that are not part of the assigned client configuration profiles. In another embodiment, the policy modifications can be changes to the policies that are in an existing template installed on the client.

In some embodiments, policies and preferences contained in a client configuration profile or specified by a client configuration profile can be applied to various subsystems in a client. As noted above, policies propagated to a client through the use of the client configuration profile can also be propagated to sub-clients or agents of that client. Accordingly, a client configuration profile can have policies or preferences for client operation in general or that are unique to one or more sub-clients or agents that are part of that client. For the clients and at each property level there can be a mix of properties determined by both the template and those defined specifically for that object.

Figure 4:
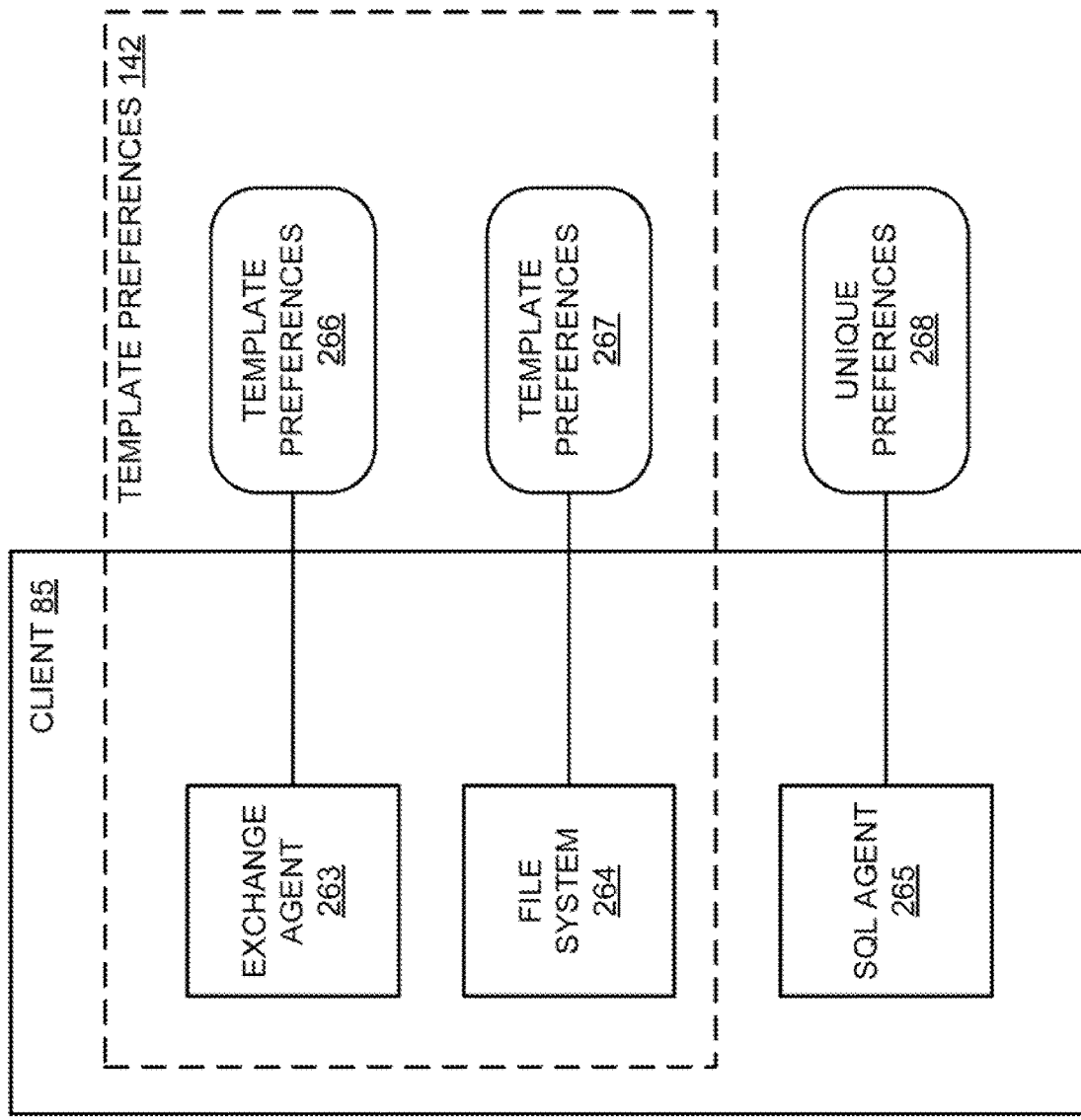
FIG. 4 is a diagram illustrating an example of an application of a client configuration profile to a client in accordance with one embodiment of the systems and methods described herein.

FIG. 4 is a diagram illustrating an example of an application of a client configuration profile to a client in accordance with one embodiment of the systems and methods described herein. In the example illustrated in FIG. 4, an example client 85 is illustrated as having an exchange agent 263, a file system 264 and a SQL agent 265. This example also illustrates a client configuration profile having template preferences 142 applied to client 85. However, in this example, policies or preferences specified by template preferences 142 are used to govern the operation of exchange agent 263 and file system 264. Template preferences 142 does not affect SQL agent 265. As further illustrated in this example, template policies or preferences 266 govern the operation of exchange agent 263 and template policies or preferences 267 govern the operation of file system 264. Unique preferences 268, which are not part of template 142, govern the operation of SQL agent 265. Although not illustrated, additional policies or preference can be applied to the exchange agent 263 and SQL agent 264 in addition to those found in template 142. As this example illustrates, SQL agent 265 can be assigned policies 268 that are unique to SQL agent 265 in client 85. Statistically, a situation can arise in which unique preferences 268 are the same as those applied to a different client, however the unique preferences are not applied as part of a template process to multiple clients. In contrast, template preferences 266, 267 are the same as those applied to other clients using template 142. Accordingly, these are applied uniformly across client 85 to which template 142 is assigned. In some embodiments, these can be modified or changed for one client independent of the other clients that the application of the template can remain uniform across all clients.

Although the template policies and preferences 266, 267 are illustrated as being found within a single template 142 in this example, template preferences 266, 267 can be included in separate templates, or subsets of preferences 266 or preferences 267 can be included in different templates. Accordingly, multiple templates can be applied to a given client each having preferences that affect various operations of the client. Additionally, a configuration policy can apply to entire client, but template can include any number of policies that might apply to particular agents were a given number of agents. In such configurations, a client applies the policies or properties that are applicable to the client configuration. For example, even in a situation where a template may support a larger number of agents than are found in a given client, the client will use those policies for the agents that the client has.

Figure 5:
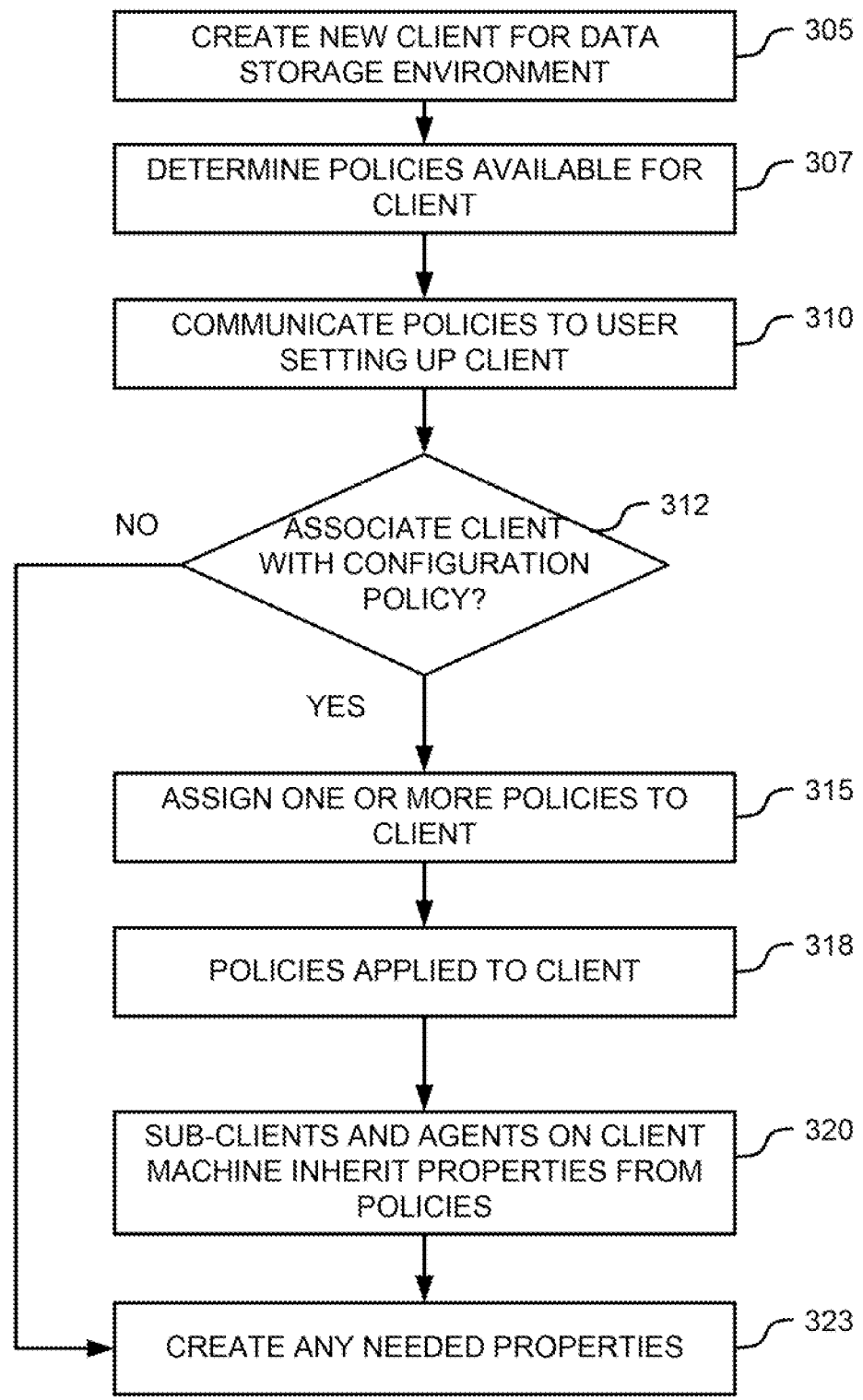
FIG. 5 is a diagram illustrating another example process for propagating policies to a client in accordance with one embodiment of the systems and methods described herein.

FIG. 5 is a diagram illustrating another example process for propagating policies to a client in accordance with one embodiment of the systems and methods described herein. Referring now to FIG. 5, at operation 305 new client is created for the data storage environment. This operation can be similar to, for example, operation 242 of FIG. 3. At operation 307, the system determines what policies are available for the client. More particularly, in terms of the examples described above, the system determines whether there are any client configuration profiles that can be applied to the client. At operation 310, available client configuration profiles are communicated to the user setting up the client for example, in one embodiment, a list of available client configuration profiles is displayed to the user on the system GUI. As noted above, in some embodiments, a client configuration profile can be configured as a model client that appears to the user as a regular client but that includes the client configuration profile policies governing operation of the client. In various embodiments, the system can provide additional information to the user indicating policies contained in a client configuration profile. Accordingly, the user can determine an appropriate client configuration profile that matches the desired performance characteristics or requirements of the client being installed. Likewise, the client configuration profiles can be named to facilitate speedier recognition. As also noted above, in other embodiments, the system may automatically associate a template to a client without user input.

Accordingly, if a client configuration profile is associated with a client, the policies in that template are propagated to the client and applied. This is illustrated at operation 312, 315 and 318.

In some embodiments, the system can be configured such that sub-clients and agents on a client machine and character properties of a client configuration profile assigned to their respective client. This is illustrated at operation 320. Additional properties are policies may be needed or desired for the new client. Accordingly, at operation 323 these two properties are created as part of the client installation process. In some embodiments, these changes or additional preferences can be added to the client configuration profile, allowing the client configuration profile to be updated. In other embodiments, a client and its existing preferences can be merged with a client configuration profile to add additional features to the client. Priority assigned to existing client features and client configuration profile features such that conflicts can be resolved between the two. For example, where a given policy of a client configuration profile conflicts with a policy already on an existing client, the relative priority designation between the two can dictate which policy is applied to the client. In one embodiment for most properties, client configuration profile properties given priority over native client properties. For some properties, like operational windows, the operational windows for the entity is defined as the sum of both the client configuration profile and native properties. Other properties that will be handled this way need to be determined.

If a client that is part of a client configuration profile contains an agent whose type is not currently defined for that client configuration profile, the properties for the client are not governed by the client configuration profile. In other words, the default values for properties of a given type won't be used for these agents until the agent type is made part of the client configuration profile. Methods are provided at each entity level (Client, agent, instance, backupset, subclient, etc.) to identify that object as being part of a client configuration profile.

In some embodiments, client configuration profiles are protected from alteration or modifications are made to a given client. This can be used to protect the integrity of a client configuration profile such that it is uniformly and consistently applied across all client machines. Accordingly, the system can be configured to allow modifications to policies or preferences applied to machine to ensure that those alterations are client specific and not propagated to the client configuration profile. Warnings can be provided to the user attempting to modify policies contained in the client configuration profile indicating that the operations are not permitted or indicating that the operations will break the link between the client and the client configuration profile. In some embodiments, where the link is broken between the client and the template, authorized template updates will not be propagated to the client but will be propagated to other clients that are still linked to the template.

In one embodiment, CPP objects and their properties can be defined using appManger tables and identified as such by setting a new "CV_STATUS_CCP" flag in the appropriate object tables: App_client, App_idaName, App_instanceName. App_backupSetName and App_subClientProp. An additional column in each of these tables (except app_client) may be used to facilitate maintenance of the client configuration profile. An additional table, API_CCPStatic table lists all properties, chksums, entity levels as well as whether or not the property is subject to "Point In Time". The primary purpose of this table is to identify which properties are potentially governed by a client configuration profile.

In one embodiment, when clients are associated to a client configuration profile, all the properties of the client configuration profile are pushed (copied) to the property tables of the corresponding objects in the client. The property tables contain two columns to accommodate the client configuration profile properties. An ID column contains the component name of the object from which the property came. This column contains "0" for properties not from the client configuration profile. The second column is used to determine what properties need to be updated whenever they are modified on the client configuration profile. Properties modified in the client configuration profile are pushed in bulk into the associated objects by a stored procedure call after all the properties are flushed to the appropriate client configuration profile property tables. For example, properties are pushed in bulk when an appropriate stored procedure is called in the appropriate GUI Server method after all the properties are modified. An application manager call determines whether or not the property is associated with a client configuration profile and decides whether or not to call the stored procedure that will "push" the properties to the appropriate entities. In some embodiments, two database operations are used; one to update existing rows and the other to do inserts. Two operations are used to satisfy the aging requirements of point-in-time properties.

In another embodiment, data stored by a client can be flagged with template information so that a template can be associated not only with a client, but also with its data. Accordingly, if the data is reloaded onto a new machine, for example, the machine can be updated with the template information associated with that data. As a further example, if a full backup is made and a client restored using the backup data, template preferences for that data can automatically be associated with the client when the backup data is loaded.

Figure 6:
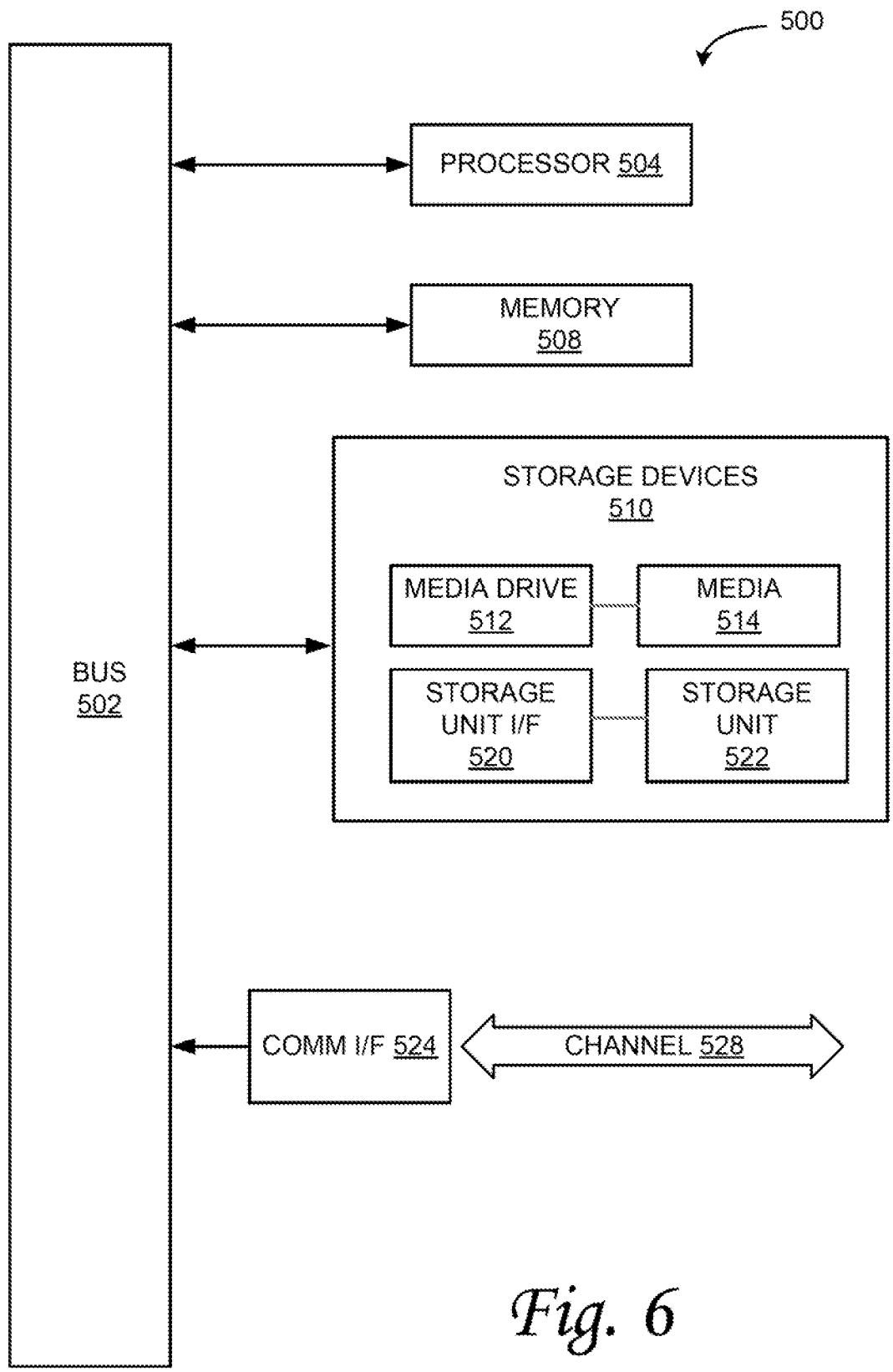
FIG. 6 is a diagram illustrating an example computing system with which aspects of the systems and methods described herein can be implemented in accordance with one embodiment of the invention.

As used herein, the term module might describe a given unit of functionality that will be performed in accordance with one or more embodiments of the present invention. As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example-computing module is shown in FIG. 6. Various embodiments are described in terms of this example computing module 500. After reading this description, it will become apparent to a person skilled in the relevant art how to implement the invention using other computing modules or architectures.

Referring now to FIG. 6, computing module 500 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special purpose or general-purpose computing devices as may be desirable or appropriate for a given application or environment. Computing module 500 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 500 might include, for example, one or more processors, controllers, control modules, or other processing devices, such as a processor 504. Processor 504 might be implemented using a general-purpose or special-purpose processing engine such as, for example, a microprocessor, controller, or other control logic. In the example illustrated in FIG. 6, processor 504 is connected to a bus 502, although any communication medium can be used to facilitate interaction with other components of computing module 500 or to communicate externally.

Computing module 500 might also include one or more memory modules, simply referred to herein as main memory 508. For example, preferably random access memory (RAM) or other dynamic memory might be used for storing information and instructions to be executed by processor 504. Main memory 508 might also be used for storing temporary variables or other intermediate information during execution of instructions to be executed by processor 504. Computing module 500 might likewise include a read only memory ("ROM") or other static storage device coupled to bus 502 for storing static information and instructions for processor 504.

The computing module 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a floppy disk drive, a magnetic tape drive, an optical disk drive, a CD or DVD drive (R or RW), or other removable or fixed media drive might be provided. Accordingly, storage media 514, might include, for example, a hard disk, a floppy disk, magnetic tape, cartridge, optical disk, a CD or DVD, or other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing module 500. Such instrumentalities might include, for example, a fixed or removable storage unit 522 and an interface 520. Examples of such storage units 522 and interfaces 520 can include a program cartridge and cartridge interface, a removable memory (for' example, a flash memory or other removable memory module) and memory slot, a PCMCIA slot and card, and other fixed or removable storage units 522 and interfaces 520 that allow software and data to be transferred from the storage unit 522 to computing module 500.

Computing module 500 might also include a communications interface 524. Communications interface 524 might be used to allow software and data to be transferred between computing module 500 and external devices. Examples of communications interface 524 might include a modem or softmodem, a network interface (such as an Ethernet, network interface card, WiMedia, IEEE 802:XX or other interface), a communications port (such as for example, a USB port, IR port, RS232 port Bluetooth® interface, or other port), or other communications interface. Software and data transferred via communications interface 524 might typically be carried on signals, which can be electronic, electromagnetic (which includes optical) or other signals capable of being exchanged by a given communications interface 524. These signals might be provided to communications interface 524 via a channel 528. This channel 528 might carry signals and might be implemented using a wired or wireless communication medium. These signals can deliver the software and data from memory or other storage medium in one computing system to memory or other storage medium in computing system 500. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to physical storage media such as, for example, memory 508, storage unit 520, and media 514. These and other various forms of computer program media or computer usable media may be involved in storing one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 500 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof: unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given lime, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computing system comprising:
    a client computing device comprising a processor coupled to a memory; and
    one or more computing devices external to the client computing device, wherein the one or more computing devices comprises one or more processors communicatively coupled to the one or more processors, wherein the one or more processors is configured to:
        define a client configuration profile comprising a storage operation property, wherein the storage operation property regulates criteria for performing a storage operation on the client computing device, wherein the storage operation property is independent of a native client storage operation property existing in the client computing device;
        associate the client computing device with the client configuration profile comprising the storage operation property;
    wherein a data agent executing on the client computing device is configured to:
        determine a conflict between the storage operation property in the client configuration profile and the native client storage operation property;
        in response to determining the conflict, select the storage operation property in the client configuration profile; and
        perform the storage operation based on the selected storage operation property in the client configuration profile.

2. The computing system of claim 1 wherein the selection of the storage operation property is based on a priority assigned to the storage operation property in the client configuration profile and to the native client storage operation property in the client computing device.

3. The computing system of claim 1 wherein the processor is further configured to:
    communicate the storage operation property in the client configuration profile to the client computing device for storage in a data structure therein.

4. The computing system of claim 1 wherein the processor is further configured to:
    update the client configuration profile associated with the client computing device based on a combination of the storage operation property and the native client storage operation property.

5. The computing system of claim 1 wherein the processor is further configured to:
    determine that data has moved from the client computing device to another client computing device different from the client computing device; and
    transfer the client configuration profile to the another client computing device.

6. The computing system of claim 1 wherein the storage operation property is applied to the storage operation according to a data type being operated upon.

7. The computing system of claim 6 wherein the data type is based on one or more of: an operating system type and an application type of the client computing device.

8. The computing system of claim 6 wherein the data type comprises one or more of Microsoft Exchange data, Lotus Notes data, Microsoft Windows file system data, and Microsoft Active Directory data.

9. The computing system of claim 1 wherein a first storage operation property of the client computing device comprises a combination of the native client storage operation property and the storage operation property in the client configuration profile.

10. The computing system of claim 1 wherein the processor is further configured to:
    create a new client configuration profile based on a combination of the client configuration profile and the native client storage operation property.

11. A computer-implemented method comprising:
    by one or more computing devices:
        defining a client configuration profile comprising a storage operation property,
            wherein the storage operation property regulates criteria for performing a storage operation on a client computing device,
            wherein the storage operation property is independent of a native client storage operation property existing in the one or more client computing devices;
        associating the client computing device with the client configuration profile comprising the storage operation property;
        determining a conflict between the storage operation property in the client configuration profile and the native client storage operation property;
        in response to determining the conflict, selecting the storage operation property in the client configuration profile; and
        performing the storage operation based on the selected storage operation property in the client configuration profile.

12. The computer-implemented method of claim 11 wherein the selecting of the storage operation property is based on a priority assigned to the storage operation property in the client configuration profile and to the native client storage operation property.

13. The computer-implemented method of claim 11 further comprising:
    communicating the storage operation property in the client configuration profile to the client computing device for storage in a data structure therein.

14. The computer-implemented method of claim 11 further comprising:
  updating the client configuration profile associated with the client computing device based on a combination of the storage operation property and the native client storage operation property.

15. The computer-implemented method of claim 11 further comprising:
  determining that data has moved from the client computing device to another client computing device different from the client computing device; and
  transferring the client configuration profile to the another client computing device.

16. The computer-implemented method of claim 11 wherein the storage operation property is applied to the storage operation according to a data type being operated upon.

17. The computer-implemented method of claim 16 wherein the data type is based on one or more of: an operating system type and an application type of the client computing device.

18. The computer-implemented method of claim 16 wherein the data type comprises one or more of Microsoft Exchange data, Lotus Notes data, Microsoft Windows file system data, and Microsoft Active Directory data.

19. The computer-implemented method of claim 11 wherein a first storage operation property of the client computing device comprises a combination of the native client storage operation property and the storage operation property in the client configuration profile.

20. The computer-implemented method of claim 11 further comprising:
  creating a new client configuration profile based on a combination of the client configuration profile and the native client storage operation property.

* * * * *